United States Patent
Matsumoto et al.

(10) Patent No.: US 10,060,015 B2
(45) Date of Patent: Aug. 28, 2018

(54) STEEL FOR HIGH-STRENGTH BOLTS WHICH HAS EXCELLENT DELAYED FRACTURE RESISTANCE AND BOLT FORMABILITY, AND BOLT

(71) Applicant: Kobe Steel, Ltd., Kobe-shi (JP)

(72) Inventors: Yosuke Matsumoto, Kobe (JP); Atsushi Inada, Kobe (JP); Masamichi Chiba, Kobe (JP); Yoshimasa Ureshino, Toyota (JP); Reiko Kato, Toyota (JP)

(73) Assignee: Kobe Steel, Ltd., Kobe-shi (JP)

( * ) Notice: Subject to any disclaimer, the term of this patent is extended or adjusted under 35 U.S.C. 154(b) by 198 days.

(21) Appl. No.: 15/022,857

(22) PCT Filed: Sep. 16, 2014

(86) PCT No.: PCT/JP2014/074393
§ 371 (c)(1),
(2) Date: Mar. 17, 2016

(87) PCT Pub. No.: WO2015/045951
PCT Pub. Date: Apr. 2, 2015

(65) Prior Publication Data
US 2016/0230260 A1    Aug. 11, 2016

(30) Foreign Application Priority Data
Sep. 25, 2013  (JP) .................................. 2013-198742

(51) Int. Cl.
*C22C 38/44* (2006.01)
*C22C 38/46* (2006.01)
(Continued)

(52) U.S. Cl.
CPC .............. *C22C 38/50* (2013.01); *C21D 1/18* (2013.01); *C21D 1/25* (2013.01); *C21D 6/004* (2013.01);
(Continued)

(58) Field of Classification Search
None
See application file for complete search history.

(56) References Cited

U.S. PATENT DOCUMENTS

2007/0017610 A1  1/2007 Yoshida et al.
2012/0298262 A1  11/2012 Hirakami et al.

FOREIGN PATENT DOCUMENTS

CN   1275632 A   12/2000
CN   1900344 A    1/2007
(Continued)

OTHER PUBLICATIONS

Machine-English translation of JP2011047010, Chiba Masamichi, Mar. 10, 2011.*

(Continued)

*Primary Examiner* — Deborah Yee
(74) *Attorney, Agent, or Firm* — Oblon, McClelland, Maier & Neustadt, L.L.P.

(57) ABSTRACT

To provide a steel for high-strength bolts, which can exhibit the sufficient delayed fracture resistance under the severe environment, and also has excellent bolt formability. The steel for high-strength bolts of the present invention includes C: 0.10 to 0.30%; and Ni: 0.4 to 0.7%, with the chemical composition being appropriately adjust, and satisfies the following formulas (1) and (2):

$$0.85 \leq [C]+[Si]/7+[Mn]/5+[Ni]/20+[Cr]/9+[Mo]/2 \leq 1.3 \quad (1)$$

$$[C]-(0.07 \times [Mo]+0.20 \times [V]) \leq 0.20 \quad (2).$$

6 Claims, 2 Drawing Sheets

(51) Int. Cl.

| | |
|---|---|
| *C22C 38/50* | (2006.01) |
| *C21D 9/00* | (2006.01) |
| *C21D 1/25* | (2006.01) |
| *F16B 31/06* | (2006.01) |
| *C22C 38/00* | (2006.01) |
| *C21D 1/18* | (2006.01) |
| *C21D 6/00* | (2006.01) |
| *C22C 38/02* | (2006.01) |
| *C22C 38/04* | (2006.01) |
| *C22C 38/06* | (2006.01) |
| *C22C 38/42* | (2006.01) |

(52) U.S. Cl.
CPC ............ *C21D 6/005* (2013.01); *C21D 6/008* (2013.01); *C21D 9/0093* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *F16B 31/06* (2013.01)

(56) References Cited

FOREIGN PATENT DOCUMENTS

| | | |
|---|---|---|
| CN | 102260831 A | 11/2011 |
| CN | 102791898 A | 11/2012 |
| JP | 06-271975 A | 9/1994 |
| JP | 08-060236 A | 3/1996 |
| JP | 09-263876 A | 10/1997 |
| JP | 10-017985 A | 1/1998 |
| JP | 2004-076086 A | 3/2004 |
| JP | 2004-084010 A | 3/2004 |
| JP | 2006-045670 A | 2/2006 |
| JP | 2006-291295 A | 10/2006 |
| JP | 2007-031734 A | 2/2007 |
| JP | 2008-280583 A | 11/2008 |
| JP | 2011-047010 A | 3/2011 |

OTHER PUBLICATIONS

Machine-English translation of JP2004076086 A, Namiura Yuichi et al. Mar. 11, 2004.*

International Search Report dated Dec. 16, 2014 for PCT/JP2014/074393 filed on Sep. 16, 2014.

International Preliminary Report on Patentability and Written Opinion of the International Searching Authority dated Apr. 7, 2016 in PCT/JP2014/074393 (with English language translation).

* cited by examiner

STEEL FOR HIGH-STRENGTH BOLTS WHICH HAS EXCELLENT DELAYED FRACTURE RESISTANCE AND BOLT FORMABILITY, AND BOLT

TECHNICAL FIELD

The present invention relates to a steel for bolts that is used for vehicles, various industrial machines, and the like, and to bolts obtained using the steel for bolts. In particular, the present invention relates to a steel for bolts that is useful as material for high-strength bolts and exhibits excellent delayed fracture resistance and bolt formability even with a tensile strength of 1,100 MPa or more.

BACKGROUND ART

As general steels for bolts, particularly, JIS standard steels, such as SCM435 or SCM440, are used widely. However, some of these general-purpose steels with a tensile strength of 1,100 MPa or more have the problem that they tend to suddenly cause brittle fracture after fastening for a certain period of time, or so-called delayed fracture. For the purpose of improving the properties for the delayed fracture, that is, the delayed fracture resistance, a steel for high-strength bolts is proposed that has improved the temper-softening resistance.

For example, Patent Document 1 has proposed a technique for improving the resistance to hydrogen embrittlement and the delayed fracture resistance of a steel by dispersing, into the steel, an appropriate amount of a composite compound having a size of 50 nm or less, the composite compound including a Mo-based compound, a Ti-based compound, a V-based compound, or a carbide or a nitride containing two or more kinds of elements selected from the group of Mo, Ti, and V.

Patent Documents 2 and 3 have proposed a technique for improving the delayed fracture resistance by adjusting a chemical composition of a steel and also controlling the conditions for quenching and tempering during manufacturing of bolts as appropriate.

PRIOR ART DOCUMENT

Patent Document

Patent Document 1: JP 10-17985 A
Patent Document 2: JP 2004-84010 A
Patent Document 3: JP 2007-31734 A

SUMMARY OF INVENTION

Problems to be Solved by the Invention

As mentioned above, the composite compound such as the carbide or nitride is precipitated in a large amount to form hydrogen trap sites, or a manufacturing step for bolts is devised to enhance the temper-softening resistance of the steel, which can improve the delayed fracture resistance of the steel to some extent. However, when the usage environment of bolts becomes more severe, the amount of hydrogen entry into a bolt from the usage environment would exceed the limit amount of hydrogen that is deactivated by the hydrogen trap through the carbides or nitrides. This increases the amount of diffusible hydrogen, which could cause the delayed fracture, leading to breakage of steel of the bolt.

In the above-mentioned Patent Document 1, the delayed fracture resistance of the steel is evaluated by applying a certain load to the steel in water. In the above-mentioned Patent Document 2, the delayed fracture resistance of the steel is evaluated by immersing the steel in hydrochloric acid for a certain time and then applying the certain load to the steel in the atmosphere. However, in any case, if the environment for evaluation becomes more severe, the delayed fracture resistance might be reduced.

On the other hand, the above-mentioned Patent Document 3 relates to a high-strength bolt with a tensile strength of 1,400 MPa or more and excellent delayed fracture resistance. When the tensile strength of the steel is 1,400 MPa or more, however, the delayed fracture resistance might be degraded under the severe environment, in which corrosion of the steel and hydrogen entry into the steel progress in parallel. In the above-mentioned Patent Document 3, a compressive residual stress needs to be applied to the bottom of a screw, which can lead to an increase in manufacturing cost.

No technical feature in the related art proposed to improve the delayed fracture resistance in this way achieves the sufficient delayed fracture resistance under the severe environment.

The present invention has been made in view of the foregoing circumstances, and it is an object of the present invention to provide a steel for high-strength bolts that can exhibit the sufficient delayed fracture resistance under the severe environment that would otherwise increase the amount of hydrogen entry into a bolt or the level of corrosion of the bolt, while keeping the high strength required for the bolt, and that can manufacture bolts with excellent bolt formability, and also to provide a bolt obtained from the steel for the bolts.

Means for Solving the Problems

A steel for high-strength bolts according to the present invention, which can solve the above-mentioned problem, includes, in percentage by mass: C: 0.10 to 0.30% (in terms of % by mass, the same shall apply to each chemical composition, hereinafter); Ni: 0.4 to 0.7%; Si: 0% or more and 0.2% or less; Mn: 0.3 to 0.8%; P: more than 0% and 0.03% or less; S: more than 0% and 0.03% or less; Cr: 0.8 to 1.2%; Mo: 0.8 to 1.5%; V: 0.05 to 0.13%; Ti: 0.02 to 0.08%; Al: 0.01 to 0.1%; and N: 0.001 to 0.01%, and the balance consisting of iron and inevitable impurities, wherein the steel satisfies the following formulas (1) and (2):

$$0.85 \leq [C]+[Si]/7+[Mn]/5+[Ni]/20+[Cr]/9+[Mo]/2 \leq 1.3 \quad (1)$$

$$[C]-(0.07\times[Mo]+0.20\times[V]) \leq 0.20 \quad (2)$$

where [C], [Si], [Mn], [Ni], [Cr], [Mo], and [V] indicate the contents of C, Si, Mn, Ni, Cr, Mo, and V in percentage by mass, respectively.

The steel for high-strength bolts of the present invention is useful when it further contains Cu: more than 0% and 0.70% or less, as needed. The addition of Cu in this way further improves the delayed fracture resistance.

Further, the high-strength bolt with excellent delayed fracture resistance according to the present invention, which can solve the above-mentioned problems, is a bolt that is obtained using the above-mentioned steel for high-strength bolts, in which a grain size number of a prior austenite crystal grain size is 10.0 or more.

The high-strength bolt of the present invention with excellent delayed fracture resistance and a tensile strength of 1,100 to 1,400 MPa, which can solve the above-mentioned problems, is obtained by quenching from 880 to 960° C. using the above-mentioned steel for high-strength bolts and then tempering the steel at 550 to 650° C.

Effects of the Invention

The present invention is adapted to strictly define the chemical composition of the steel so as to satisfy the predetermined relationship, thereby producing a steel for high-strength bolts with excellent delayed fracture resistance and bolt formability. Such a steel for high-strength bolts is subjected to the heat treatments under predetermined quenching and tempering conditions. This produces the high-strength bolt that can exhibit the sufficient delayed fracture resistance even under the severe environment that would otherwise cause a large amount of hydrogen entry, while maintaining the high strength required for the bolt, and also which exhibits the excellent bolt formability. Accordingly, the steel for high-strength bolts of the present invention is very useful as the material for the high-strength bolts with excellent delayed fracture resistance and bolt formability.

MODE FOR CARRYING OUT THE INVENTION

The present inventors have studied steels for bolts from various angles to improve the delayed fracture resistance thereof. The delayed fracture is more likely to occur mainly as the strength of the bolt is increased. In particular, the bolt with a tensile strength of 1,100 MPa or more is known to drastically degrade its delayed fracture resistance. From this aspect, in the related art, a technique has been proposed in which a large amount of composite compounds, such as carbides or nitrides, is precipitated, thereby generating the hydrogen trap sites to improve the delayed fracture resistance. However, under the severe environment, even though the precipitation of the composite compounds enhances the limit hydrogen amount as mentioned above, the amount of hydrogen entry into the steel is very large, making it difficult to exhibit the excellent delayed fracture resistance.

The inventors have been intensively studied about steels for bolts and bolts that can exhibit the sufficient delayed fracture resistance even under the severe environment. As a result, it has been found that the C content is suppressed to 0.30% or less while the content of each element is controlled to satisfy a predetermined relationship, whereby the ductility of steel can be dramatically improved while the high strength required for bolts is maintained, thereby improving the delayed fracture resistance. Further, it is found that the C content is suppressed to be 0.30% or less, and Ni is contained in a predetermined amount, whereby the corrosion resistance of the bolt can be dramatically improved, thereby further improving the delayed fracture resistance. Based on these findings, the present invention has been made.

The approach to defining the present invention will be described in detail below. In the related art, a steel in which a C content is more than 0.30% is tempered at 550° C. or higher and thereby achieves both the strength and delayed fracture resistance. However, it has been found out that for the steel having a large C content of 0.30% or more, even though the hydrogen trap site is precipitated by carbonitrides containing a precipitation hardening element, such as Cr, Mo, V, or Ti, the steel has a low corrosion resistance under the severe environment. As a result, the amount of hydrogen entry becomes more than the limit amount of hydrogen, making it difficult to ensure the excellent delayed fracture resistance.

Furthermore, it has been revealed that when the C content is more than 0.30%, even though carbides are precipitated in tempering, the ductility of the steel after the tempering is degraded because of a large amount of solid-solution C in the steel, and that if the hydrogen content in the steel reaches a certain level or more, the delayed fracture is more likely to occur.

On the other hand, in a steel for bolts according to the invention, the C content is suppressed to 0.30% or less, and the above-mentioned formulas (1) and (2) are satisfied, which can significantly improve the ductility of the steel while maintaining its strength. Ni is added while suppressing the C content to 0.30% or less, thereby significantly enabling improvement of the corrosion resistance of the steel, compared to the case in which Ni is added while a C content is high. As a result, the use of the steel for bolts in the invention can significantly improve the delayed fracture resistance under the severe environment.

In the invention, as mentioned above, the steel in which the C content is suppressed to 0.30% or less is subjected to predetermined quenching and tempering. In particular, the steel is tempered at the temperature of 550° C. or higher, so that the above precipitation hardening element, such as Cr, Mo, V, or Ti, can be precipitated in the form of an alloy carbide. Thus, the solid-solution C amount contained in a parent phase of the steel for bolts can further be reduced to less than 0.30%. Fine carbides containing the above-mentioned precipitation hardening element can improve not only the strength of the steel but also the limit amount of hydrogen in the steel, whereby a combination of the effects of improvement of the ductility of the steel due to the reduction in the C content and suppression of the amount of hydrogen entry can dramatically improves the delayed fracture resistance.

The steel for bolts of the present invention is characterized by restricting the C content to 0.30% or less and containing Ni and another precipitation hardening element in a certain range, thereby improving the corrosion resistance and ductility of the bolt to enhance the delayed fracture resistance under the severe environment. To ensure other properties essential to bolts, the chemical composition of the steel needs to satisfy the following requirements.

(C: 0.10 to 0.30%)

Carbon (C) is an essential element to ensure the hardenability and strength of the steel. As the C content increases, the ductility and corrosion resistance of the steel is degraded. In the steel for bolts of the present invention, as the C content decreases, the ductility of the steel is improved. However, when the C content is less than 0.10%, martensitic transformation is less likely to occur during quenching on mass production lines, and the following expected precipitation strengthening will become insufficient. This makes it difficult to stabilize the high strength of the bolt after the quenching and tempering. On the other hand, when the C content exceeds 0.30%, the delayed fracture resistance of the steel is degraded due to the deterioration of the ductility. Therefore, the lower limit of C content is preferably 0.15% or more, and more preferably 0.20% or more, while the upper limit of C content is preferably 0.27% or less, and more preferably 0.25% or less.

(Ni: 0.4 to 0.7%)

Nickel (Ni) is an element that is effective in suppressing the hydrogen entry by improving the corrosion resistance of the steel, and also in improving the delayed fracture resistance. To sufficiently exhibit these effects, the Ni content needs to be set at 0.4% or more while the C content is suppressed to 0.30% or less as mentioned above. On the other hand, any excessive Ni content leads to an increase in cost, even though the effects of Ni are saturated. Therefore, the upper limit of Ni content should be 0.7% or less. Furthermore, the lower limit of Ni content is preferably 0.45% or more, and more preferably 0.50% or more, while the upper limit of Ni content is preferably 0.65% or less, and more preferably 0.60% or less.

(Si: 0% or more and 0.2% or less)

Silicon (Si) is an element that is effective in ensuring the strength of the steel. However, any excessive Si content degrades the bolt formability. Therefore, the Si content needs to be 0.2% or less. Furthermore, the Si content is preferably 0.15% or less, and more preferably 0.1% or less. Note that the lower limit of Si content may be 0%, but the Si content is preferably set, for example, at 0.005% or more and particularly about 0.01% or more because of contamination from raw material, refractory, etc.

(Mn: 0.3 to 0.8%)

Manganese (Mn) is an element for improving the hardenability. Thus, Mn is effective in achieving the high strength. To exhibit such effects, the Mn content needs to be 0.3% or more. On the other hand, any excessive Mn content assists in segregation into the grain boundary to degrade the strength of the grain boundary, which makes it more likely to cause the delayed fracture. From this aspect, the upper limit of Mn content is suppressed to 0.8% or less. The lower limit of Mn content is preferably 0.40% or more, and more preferably 0.45% or more, while the upper limit of Mn content is preferably 0.70% or less, and more preferably 0.60% or less.

(P: More than 0% and 0.03% or Less)

Phosphorus (P) is an element that encourages the grain boundary fracture due to the segregation of the grain boundary to degrade the delayed fracture resistance. Thus, the P content is desirable if it is as low as possible, and the upper limit of P content is set at 0.03% or less. Setting the P content at 0% is so difficult that the P content should be preferably approximately 0.001% or more. The upper limit of P content is preferably 0.02% or less, and more preferably 0.01% or less.

(S: More than 0% and 0.03% or Less)

Sulfur (S) acts to form MnS in a steel. The MnS becomes a stress concentration point when the stress is applied and thus could serve as a starting point of delayed fracture. To improve the delayed fracture resistance, the S content needs to be reduced as much as possible. In the present invention, the S content is suppressed to 0.03% or less. Setting the S content at 0% is so difficult that the S content should be preferably approximately 0.001% or more. Therefore, the upper limit of S content is preferably 0.02% or less, and more preferably 0.01% or less.

(Cr: 0.8 to 1.2%)

Chrome (Cr) serves to enhance the hardenability and corrosion resistance of the steel. Additionally, Cr effectively acts to improve the strength and delayed fracture resistance of the steel as it is precipitated in the form of carbide during tempering as mentioned above. To sufficiently exhibit these effects, the Cr content needs to be set at 0.8% or more. On the other hand, any excessive Cr content degrades its cold formability to reduce the bolt formability. Therefore, the Cr content needs to be 1.2% or less. The lower limit of Cr content is preferably 0.90% or more, and more preferably 0.95% or more, while the upper limit of Cr content is preferably 1.10% or less, and more preferably 1.05% or less.

(Mo: 0.8 to 1.5%)

Molybdenum (Mo) is an element that improves the hardenability and is effective in improving the strength of the steel after the tempering as it is the precipitation hardening element. Since in the steel for bolts of the present invention, the C content is suppressed to 0.30% or less as mentioned above, Mo needs to be contained in an amount of 0.8% or more to ensure the high strength required for the bolt. On the other hand, any excessive Mo content deteriorates the cold formability, degrading the bolt formability. Therefore, the upper limit of Mo content is set at 1.5% or less. The lower limit of Mo content is preferably 0.85% or more, and more preferably 0.90% or more, while the upper limit of Mo content is preferably 1.20% or less, and more preferably 1.10% or less.

(V: 0.05 to 0.13%)

Vanadium (V) can improve the strength and delayed fracture resistance of the steel by carbides precipitated during tempering while refining crystal grains of a steel. To exhibit these functions, the V content needs to be 0.05% or more. However, any excessive V content precipitates coarse carbides in rolling, degrading the cold formability or causing an increase in cost. Therefore, the upper limit of V content needs to be 0.13% or less. The lower limit of V content is preferably 0.06% or more, and more preferably 0.08% or more, while the upper limit of V content is preferably 0.10% or less, and more preferably 0.09% or less.

(Ti: 0.02 to 0.08%)

Titanium (Ti) is transformed into TIN or TIC at the rolling stage and can be utilized as a hydrogen trap site. To exhibit such an effect, the Ti content needs to be 0.02% or more. However, any excessive Ti content precipitates coarse carbides, degrading the cold formability or causing an increase in cost. Therefore, the upper limit of Ti content should be 0.08% or less. Furthermore, the lower limit of Ti content is preferably 0.03% or more, and more preferably 0.04% or more, while the upper limit of Ti content is preferably 0.07% or less, and more preferably 0.06% or less.

(Al: 0.01 to 0.1%)

Aluminum (Al) is an element effective as a deoxidizing agent and has an effect of refining crystal grains by forming AlN. Taking the use of the deoxidizing agent into consideration, the Al content exceeds 0% in reality, but from the viewpoint of exhibiting the crystal-grain refining effect, the Al content should be set at 0.01% or more. Furthermore, the Al content is preferably 0.02% or more, and more preferably 0.03% or more. On the other hand, with an increase in the Al content, the amount of coarse carbonitride inclusions is increased, easily reducing the delayed fracture resistance. Therefore, the Al content is suppressed to 0.1% or less. The Al content is preferably 0.08% or less, and more preferably 0.06% or less.

(N: 0.001 to 0.01%)

Nitrogen (N) binds to Ti at the solidification stage after smelting a steel to form TiN. Since TiN is not melted even when being heated at a high temperature, TiN decreases the amount of TiC generated during the tempering, leading to degradation in delayed fracture resistance. Therefore, the N content needs to be 0.01% or less. Setting the N content at 0% is so difficult that the N content is normally 0.001% or more. The lower limit of N content is preferably 0.005% or more, and more preferably 0.006% or more, while the upper limit of N content is preferably 0.009% or less, and more preferably 0.008% or less.

The basic components in the steel for high-strength bolts of the present invention have been mentioned above, and the balance consisting of iron and inevitable impurities. In detail, regarding impurities other than the above-mentioned P and S, contamination of elements brought into the steel can be allowed as the inevitable impurities, depending on raw material, building materials, manufacturing equipment, etc.

The steel for high-strength bolts of the present invention is further useful especially when it further contains Cu: more than 0% and 0.70% or less, as needed.

(Cu: More than 0% and 0.70% or Less)

Like Ni mentioned above, copper (Cu) is an element effective in enhancing the corrosion resistance to thereby suppress the hydrogen entry and further improving the delayed fracture resistance. However, any excessive Cu content causes an increase in cost while saturating these effects thereof. From this aspect, the upper limit of Cu content is preferably suppressed to 0.70% or less. Therefore, the upper limit of Cu content is preferably 0.65% or less, and more preferably 0.60% or less. To effectively exhibit the above-mentioned effects, the lower limit of Cu content is preferably 0.40% or more, more preferably 0.45% or more, and most preferably 0.50% or more.

The steel for bolts of the present invention cannot achieve the object of the present invention only by appropriately adjusting the contents of respective components in respective ranges as mentioned above, and thus needs to satisfy the relationships represented by the following formulas (1) and (2). These function effects are as follows:

$$0.85 \leq [C]+[Si]/7+[Mn]/5+[Ni]/20+[Cr]/9+[Mo]/2 \leq 1.3 \quad (1)$$

$$[C]-(0.07\times[Mo]+0.20\times[V]) \leq 0.20 \quad (2)$$

where [C], [Si], [Mn], [Ni], [Cr], [Mo], and [V] indicate the contents of C, Si, Mn, Ni, Cr, Mo, and V in percentage by mass, respectively.

Hereinafter, a value obtained by calculation of ([C]+[Si]/7+[Mn]/5+[Ni]/20+[Cr]/9+[Mo]/2) in the above formula (1) is sometimes referred to as an "A value". Further, a value obtained by calculation of [[C]−(0.07×[Mo]+0.20×[V])] in the above formula (2) is sometimes referred to as a "B value".

The above formula (1) is an formula corresponding to a carbon equivalent in the steel. The steel for bolts of the present invention suppresses the C content to 0.30% or less, thereby decreasing the amount of hydrogen entry. To ensure the high strength required for bolts, the carbon equivalent represented by the A value in the above formula (1) needs to be 0.85 or more. The A value of less than 0.85 makes it difficult to ensure the strength of 1,100 MPa or more at a tempering temperature of 550° C. or higher. On the other hand, any excessive A value increases an alloy content, leading to a high cost of the steel. Therefore, the upper limit of A value is set at 1.3 or less. The lower limit of A value is preferably 0.93 or more, and more preferably 0.95 or more, while the upper limit of A value is preferably 1.10 or less, and more preferably 1.05 or less.

The above formula (2) is a relational expression conveniently indicating how much carbon in the steel will be consumed by precipitation of Mo and V in the form of carbides during the tempering treatment. Here, 0.07 which is a coefficient of Mo is the atomic weight ratio of Mo to C in a carbide $Mo_2C$; and 0.20 which is a coefficient of V is the atomic weight ratio of V to C in a carbide $V_4C_3$. The B value in the above formula (2) does not mean the solid-solution C content in the steel, but can be utilized as a value for relative comparison regarding how much the solid-solution C is left after the tempering treatment. Thus, the B value is an index for evaluating the ductility of the steel. To exhibit the good ductility, the B value needs to be 0.20 or less. The upper limit of B value is preferably 0.17 or less, and more preferably 0.15 or less, while the lower limit of B value is preferably 0.02 or more, and more preferably 0.03 or more.

The steel for bolts of the present invention has been described above.

The present invention also covers a bolt obtained by using the above-mentioned steel for bolts. In detail, the bolt of the present invention is produced by quenching the above-mentioned steel for bolts from 880 to 960° C., and then tempering the quenched steel from 550 to 650° C., and thus exhibits excellent delayed fracture resistance and satisfies the high tensile strength of 1,100 to 1,400 MPa.

That is, the steel for bolts of the present invention with the above-mentioned chemical composition has potentially excellent strength properties and delayed fracture resistance. To obtain the high-strength bolt with the excellent strength properties and delayed fracture resistance by using this steel, it is recommended that the steel is processed into a predetermined bolt shape, and then subjected to quenching and tempering under appropriate conditions.

Specifically, the heating temperature for quenching is 880° C. or higher. When the heating temperature for quenching is lower than 880° C., the precipitation hardening element, such as Cr, Mo, V, or Ti is not solid-soluted in the steel, and then sufficient precipitates cannot be ensured even after the tempering. Although spheroidizing annealing is performed before the quenching, when the heating temperature in the quenching is low, spheroidized carbides are sometimes present in the microstructure of the steel before quenching. In this case, the spheroidized carbides are not melted completely and remain, making it difficult to obtain a predetermined tensile strength. The heating temperature for quenching is preferably 900° C. or higher. On the other hand, when the heating temperature for quenching is excessively high, inconveniences can occur that include uneven quenching, and crystal grain coarsening during quenching, leading to an increase in cost for facility improvement and the like. For this reason, the heating temperature for quenching is set at 960° C. or lower, and more preferably 930° C. or lower.

On the other hand, the tempering temperature is set at 550° C. or higher to precipitate the precipitation hardening element, such as solid-soluted Cr, Mo, V, or Ti, as a fine precipitate during a heating process in the quenching. Even when the tempering is performed at a temperature lower than 550° C., the fine carbides are less likely to be precipitated, which cannot obtain the tempering softening resistance and hydrogen trap effect, failing to sufficiently improve the delayed fracture resistance. When the tempering temperature becomes low, the precipitation of cementite is insufficient, causing reduction in ductility of the steel. More preferably, the heating temperature in tempering is 570° C. or higher. On the other hand, when the tempering temperature becomes excessively high, the temper-softening resistance effect is reduced, failing to obtain the sufficient softening resistance and a predetermined strength. Therefore, the upper limit of tempering temperature is 650° C. or lower, and more preferably 600° C. or lower. Both the quenching temperature and tempering temperature are those obtained by measuring the surface temperatures of steel molded in a bolt shape.

As mentioned above, the bolt of the present invention is characterized by quenching and tempering at the above-mentioned temperatures using the steel for bolts of the present invention. The conditions for quenching and tempering except for the heating temperature can be appropriately set taking into consideration the respective heating temperatures and the properties of the precipitation hardening elements. For example, the following conditions can be adopted.

[Quenching Conditions]

Holding time for heating: preferably 10 minutes or more, and more preferably 20 minutes or more; and preferably 1 hour or less, and more preferably 50 minutes or less Cooling conditions: preferably oil cooling or water cooling Here, the holding time for heating during quenching is set to sufficiently solid-solute the precipitation hardening element existing at the center of the steel, and is preferably 10 minutes or more. As the holding time for heating during quenching become longer, the more likely the coarsening of crystal grains would be. Therefore, the upper limit of holding time for heating is preferably set to 1 hour or less.

[Tempering Conditions]

Holding time for heating: preferably 30 minutes or more, and more preferably 70 minutes or more; and preferably 3 hours or less, and more preferably 2 hours or less Cooling conditions: preferably oil cooling, water cooling, or air cooling Here, the holding time for heating in tempering is preferably 30 minutes or more to precipitate an alloy carbide. Even if the holding time for heating in tempering exceeds 3 hours, its effect is saturated. Thus, the upper limit of holding time is preferably set at 3 hours or less.

In the present invention, manufacturing conditions other than those mentioned above are not limited, and using a normal method, bolts can be manufactured. Specifically, the steel for bolts that satisfies the above-mentioned chemical composition in use is hot-rolled, and subjected to spheroidizing annealing as necessary, followed by wire-drawing. Thereafter, after the steel is subjected to cold working, such as cold forging, it is molded into the bolt shape. The molded bolt-shaped steel is threaded by rolling, and then subjected to the quenching and tempering mentioned above, whereby the bolts can be manufactured.

Here, the above-mentioned spheroidizing annealing is generally performed when the high-strength bolt having a tensile strength of 1,100 MPa or more is manufactured, followed by bolt molding. In this invention, however, as mentioned above, the steel for bolts in which the C content is suppressed to 0.30% or less is used, thus enabling molding of the steel into the bolt shape without performing spheroidizing annealing.

The bolt of the present invention obtained in the above-mentioned way exhibits a high tensile strength of 1,100 MPa or more. Furthermore, the bolt of the present invention exhibits the excellent delayed fracture resistance, though its tensile strength is high, for example, 1,100 MPa or more. Specifically, in the bolt, crystal grains are prevented from being coarsened during the quenching, and thus are fine with a grain size number of the prior austenite crystal grain size being 10.0 or more. Accordingly, the bolt has improved ductility and excellent delayed fracture resistance under a high load stress and a high temperature. The prior austenite grain size number is more preferably 10.5 or more, and more preferably 11.0 or more. As a result, a delayed fracture strength ratio to be mentioned below is 0.80 or more, and preferably 0.90 or more. Note that the upper limit of prior austenite grain size number is not specifically limited, but is preferably controlled to be approximately 13.0 or less, taking into consideration the balance between the productivity and cost. The prior austenite crystal grain size can be adjusted within the above-mentioned range by appropriately controlling, for example, the Ti content in the steel and a quenching temperature thereof. Note that the tensile strength more than 1,400 MPa makes it difficult to ensure the excellent delayed fracture resistance. Therefore, the upper limit of tensile strength of the bolt of the present invention is set at 1,400 MPa or less.

The high-strength bolts of the present invention suitable for use can include, for example, a high tension bolt, a torshear type bolt, a hot-dip galvanized high-power bolt, a rust-proof high-power bolt, and a fire resistant steel high-power bolt. The above-mentioned bolt is optimal as a bolt that has a high-strength and excellent corrosion resistance and delayed fracture resistance and which is used in fields, including a vehicle field, a construction field, and an industrial machine field.

The present application claims priority on Japanese Patent Application No. 2013-198742 filed on Sep. 25, 2013, the disclosure of which is incorporated by reference herein.

EXAMPLES

The present invention will be more specifically described below by way of examples, but is not limited to the following examples. Various modifications can be made to these examples as long as they are adaptable to the above-mentioned and below-mentioned concepts and are included within the technical scope of the invention.

Steels A to F and A1 to T1 made of the chemical compositions shown in Table 1 below were hot-rolled into a diameter of 12 mm, and then subjected to quenching and tempering on conditions shown in Table 2 below. The conditions for the hot rolling were as follows.

Reheating temperature for a billet: 1,000 to 1,200° C.,

Finish-rolling temperature: 900 to 1,100° C., Cooling after finish rolling: and cooling to 300° C. at an average cooling rate of 0.05 to 10° C./sec.

Samples obtained in this way were examined for the prior austenite grain size number, tensile strength (TS), ductility (reduction in area), reduction in mass due to corrosion, delayed fracture strength ratio, and critical upsetting rate by the following procedure.

TABLE 1

| Steel type | Chemical composition* (% by mass) | | | | | | | | | | | | | A value | B value |
|---|---|---|---|---|---|---|---|---|---|---|---|---|---|---|---|
| | C | Si | Mn | P | S | Cu | Ni | Cr | Mo | V | Ti | Al | N | | |
| A | 0.29 | 0.06 | 0.32 | 0.02 | 0.02 | — | 0.66 | 0.88 | 1.03 | 0.12 | 0.04 | 0.03 | 0.0018 | 1.01 | 0.19 |
| B | 0.25 | 0.06 | 0.50 | 0.01 | 0.01 | — | 0.55 | 1.07 | 0.90 | 0.08 | 0.08 | 0.06 | 0.0039 | 0.95 | 0.17 |
| C | 0.22 | 0.06 | 0.50 | 0.01 | 0.01 | — | 0.51 | 1.02 | 1.00 | 0.08 | 0.05 | 0.03 | 0.0034 | 0.97 | 0.13 |
| D | 0.18 | 0.06 | 0.47 | 0.01 | 0.01 | — | 0.51 | 0.95 | 0.95 | 0.06 | 0.05 | 0.05 | 0.0017 | 0.89 | 0.10 |
| E | 0.18 | 0.12 | 0.67 | 0.02 | 0.02 | 0.55 | 0.43 | 1.18 | 1.32 | 0.06 | 0.03 | 0.05 | 0.0063 | 1.14 | 0.08 |
| F | 0.12 | — | 0.52 | 0.01 | 0.02 | — | 0.51 | 1.02 | 1.42 | 0.13 | 0.08 | 0.02 | 0.0051 | 1.07 | −0.01 |
| A1 | 0.07 | 0.05 | 0.50 | 0.01 | 0.02 | — | 0.43 | 0.85 | 1.23 | 0.12 | 0.05 | 0.03 | 0.0034 | 0.91 | −0.04 |
| B1 | 0.31 | — | 0.32 | 0.01 | 0.01 | — | 0.51 | 0.81 | 1.18 | 0.12 | 0.04 | 0.03 | 0.0030 | 1.08 | 0.20 |
| C1 | 0.28 | 0.48 | 0.43 | 0.01 | 0.03 | 0.43 | 0.49 | 1.13 | 1.25 | 0.11 | 0.05 | 0.03 | 0.0032 | 1.21 | 0.17 |
| D1 | 0.15 | 0.18 | 0.15 | 0.01 | 0.01 | — | 0.42 | 0.91 | 1.09 | 0.10 | 0.06 | 0.04 | 0.0039 | 0.87 | 0.05 |
| E1 | 0.18 | 0.12 | 1.03 | 0.01 | 0.02 | — | 0.52 | 1.20 | 1.12 | 0.12 | 0.06 | 0.03 | 0.0035 | 1.12 | 0.08 |
| F1 | 0.25 | 0.19 | 0.73 | 0.04 | 0.04 | — | 0.55 | 1.12 | 0.92 | 0.12 | 0.05 | 0.03 | 0.0051 | 1.04 | 0.16 |
| G1 | 0.21 | 0.13 | 0.52 | 0.01 | 0.01 | — | 0.05 | 0.81 | 1.02 | 0.09 | 0.05 | 0.03 | 0.0042 | 0.94 | 0.12 |
| H1 | 0.21 | 0.19 | 0.53 | 0.01 | 0.02 | — | 0.53 | 0.13 | 1.05 | 0.07 | 0.05 | 0.03 | 0.0051 | 0.91 | 0.12 |
| I1 | 0.25 | 0.10 | 0.48 | 0.02 | 0.02 | — | 0.52 | 0.18 | 1.13 | 0.10 | 0.06 | 0.04 | 0.0052 | 0.97 | 0.15 |
| J1 | 0.25 | 0.17 | 0.65 | 0.01 | 0.02 | — | 0.45 | 1.53 | 0.92 | 0.07 | 0.05 | 0.02 | 0.0025 | 1.06 | 0.17 |
| K1 | 0.22 | 0.18 | 0.78 | 0.02 | 0.02 | 0.68 | 0.67 | 1.02 | 0.15 | 0.08 | 0.08 | 0.02 | 0.0035 | 0.62 | 0.19 |
| L1 | 0.12 | 0.05 | 0.33 | 0.01 | 0.02 | — | 0.45 | 0.83 | 1.91 | 0.09 | 0.04 | 0.03 | 0.0041 | 1.26 | −0.03 |
| M1 | 0.19 | 0.12 | 0.74 | 0.02 | 0.03 | — | 0.59 | 0.83 | 1.23 | — | 0.07 | 0.03 | 0.0021 | 1.09 | 0.10 |
| N1 | 0.25 | — | 0.55 | 0.01 | 0.02 | — | 0.69 | 0.98 | 1.10 | 0.34 | 0.05 | 0.02 | 0.0035 | 1.05 | 0.11 |
| O1 | 0.17 | 0.19 | 0.43 | 0.01 | 0.01 | — | 0.65 | 1.12 | 0.91 | 0.13 | — | 0.03 | 0.0022 | 0.90 | 0.08 |
| P1 | 0.18 | 0.13 | 0.32 | 0.01 | 0.02 | — | 0.44 | 1.15 | 1.33 | 0.13 | 0.13 | 0.03 | 0.0033 | 1.08 | 0.06 |
| Q1 | 0.13 | 0.08 | 0.33 | 0.01 | 0.02 | — | 0.57 | 1.15 | 0.88 | 0.07 | 0.03 | 0.04 | 0.0031 | 0.80 | 0.05 |
| R1 | 0.20 | — | 0.35 | 0.01 | 0.01 | — | 0.44 | 0.82 | 0.81 | 0.06 | 0.03 | 0.03 | 0.0035 | 0.79 | 0.13 |
| S1 | 0.29 | 0.15 | 0.77 | 0.02 | 0.02 | — | 0.53 | 1.01 | 0.81 | 0.10 | 0.04 | 0.03 | 0.0041 | 1.01 | 0.21 |
| T1 | 0.35 | 0.17 | 0.64 | 0.01 | 0.01 | — | — | 0.96 | 0.16 | — | — | 0.03 | 0.0032 | 0.69 | 0.34 |

*Balance: iron, and inevitable impurities other than P and S

TABLE 2

| | | Quenching conditions | | Tempering conditions | |
|---|---|---|---|---|---|
| Sample No. | Steel type | Temperature (° C.) | Time (minutes) | Temperature (° C.) | Time (minutes) |
| 1 | A | 910 | 45 | 580 | 90 |
| 2 | A | 950 | 45 | 580 | 90 |
| 3 | A | 880 | 45 | 580 | 90 |
| 4 | B | 900 | 45 | 630 | 90 |
| 5 | B | 950 | 45 | 630 | 90 |
| 6 | B | 880 | 45 | 630 | 90 |
| 7 | C | 930 | 45 | 600 | 90 |
| 8 | C | 950 | 45 | 600 | 90 |
| 9 | D | 930 | 45 | 580 | 120 |
| 10 | D | 950 | 45 | 580 | 120 |
| 11 | E | 910 | 30 | 600 | 90 |
| 12 | F | 930 | 30 | 600 | 70 |
| 13 | A | 910 | 45 | 400 | 90 |
| 14 | B | 900 | 45 | 450 | 90 |
| 15 | A1 | 910 | 30 | 580 | 70 |
| 16 | B1 | 930 | 40 | 580 | 90 |
| 17 | C1 | 920 | 40 | 580 | 90 |
| 18 | D1 | 920 | 50 | 580 | 120 |
| 19 | E1 | 930 | 50 | 580 | 120 |
| 20 | F1 | 910 | 40 | 560 | 120 |
| 21 | G1 | 920 | 30 | 560 | 90 |
| 22 | H1 | 950 | 30 | 560 | 120 |

TABLE 2-continued

|  |  | Quenching conditions | | Tempering conditions | |
|---|---|---|---|---|---|
| Sample No. | Steel type | Temperature (° C.) | Time (minutes) | Temperature (° C.) | Time (minutes) |
| 23 | I1 | 950 | 30 | 600 | 70 |
| 24 | J1 | 950 | 30 | 600 | 90 |
| 25 | K1 | 930 | 40 | 600 | 90 |
| 26 | L1 | 910 | 50 | 600 | 120 |
| 27 | M1 | 940 | 50 | 580 | 90 |
| 28 | N1 | 930 | 40 | 580 | 120 |
| 29 | O1 | 920 | 50 | 580 | 90 |
| 30 | P1 | 910 | 50 | 580 | 120 |
| 31 | Q1 | 930 | 40 | 580 | 90 |
| 32 | R1 | 910 | 40 | 580 | 90 |
| 33 | S1 | 910 | 45 | 580 | 90 |
| 34 | T1 | 880 | 40 | 530 | 90 |

[Measurement of Prior Austenite Grain Size Number]

Each sample subjected to quenching and tempering was observed at parts of its cross section at D/4 (D: diameter), and a prior austenite grain size number of each part was measured according to "Steels-Micrographic Determination of The Apparent Grain Size" defined by JIS G 0551.

[Measurement of Tensile Strength and Ductility]

Figure 1:
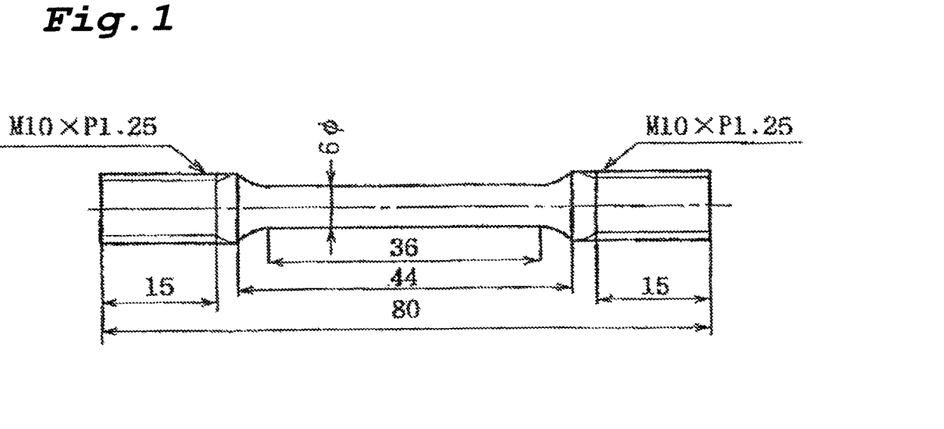
FIG. 1 is a schematic diagram showing the shape of a test specimen for a tensile test.

After measuring the prior austenite grain size number, a test specimen for a tensile test was fabricated from each sample by a cutting process as shown in FIG. 1, and the tensile test was performed on the specimen based on JIS Z2241. The unit shown in the figure is mm. In Examples, samples having a tensile strength of 1,100 MPa or more were rated as having sufficient tensile strength. A reduction in area at the tensile test of each sample was measured based on the JIS Z2241. Samples having a reduction in area of 65.0% or more were rated as having excellent ductility.

[Measurement of Reduction in Mass Due to Corrosion]

Figure 2:
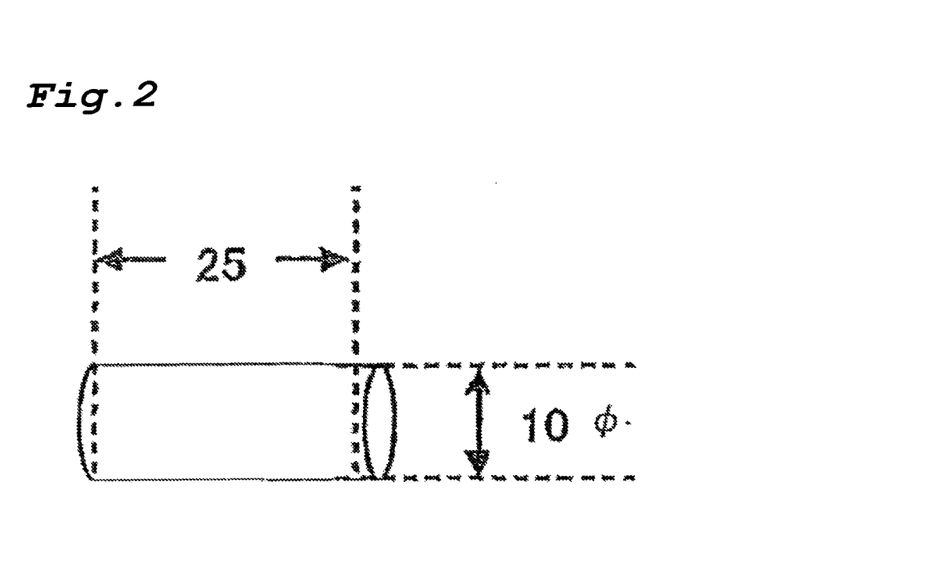
FIG. 2 is a schematic diagram showing the shape of a test specimen for a corrosion test.

After measuring the prior austenite grain size number, a test specimen for a corrosion test was fabricated from each sample by a cutting process as shown in FIG. 2, and the corrosion test was performed on the specimen by acid immersion. The unit shown in the figure is mm. The corrosion test was performed by immersing the test specimen for the corrosion test in an aqueous acid solution containing 15% by mass of HCl for 30 minutes. A change in mass of the test specimen before and after the immersion was divided by the initial mass of the test specimen and converted in terms of percentage to thereby determine a "reduction in mass due to corrosion". In Examples, samples having a reduction in mass due to corrosion of 0.02% or less were rated as having excellent corrosion resistance. Note that test specimens having a tensile strength of less than 1,100 MPa were not subjected to the corrosion test and thus a mark "-" was shown at this item in Table.

[Measurement of Delayed Fracture Strength Ratio]

Figure 3:
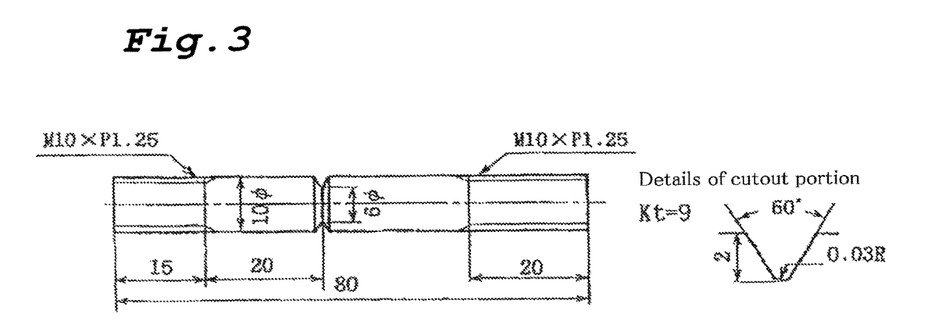
FIG. 3 is a schematic diagram showing the shape of a test specimen for a delayed fracture test.

After measuring the prior austenite grain size number and performing the tensile test, a test specimen for a delayed fracture test imitating a screw part of a bolt shown in FIG. 3 was fabricated by a cutting process from each test specimen having a tensile strength of 1,100 MPa or more, and then the delayed fracture test was performed on each test specimen. The unit shown in the drawing is mm. The result of the delayed fracture test on the test specimen is known to have good correlation with a delayed-fracture test result at a real voltage. In the delayed fracture test, each test specimen for the delayed fracture test of the sample was immersed in an aqueous acid solution of 15% by mass of HCl for 30 minutes. The maximum load stress at which the test specimen was not broken even while various levels of stresses were continuously applied to the steel for 100 hours was measured, and then the measured maximum load stress was divided by the tensile strength of the test specimen to thereby determine the "delayed fracture strength ratio". In Examples, samples having the delayed fracture strength ratio of 0.80 or more were rated as having excellent delayed fracture resistance. The samples satisfying the above-mentioned value of the delayed fracture strength ratio are known to have a very low probability of actually causing delayed fracture. Note that test specimens having a tensile strength of less than 1,100 MPa were not subjected to the delayed fracture test and thus a mark "-" was shown at this item in Table.

[Measurement of Critical Upsetting Rate]

Figure 4:
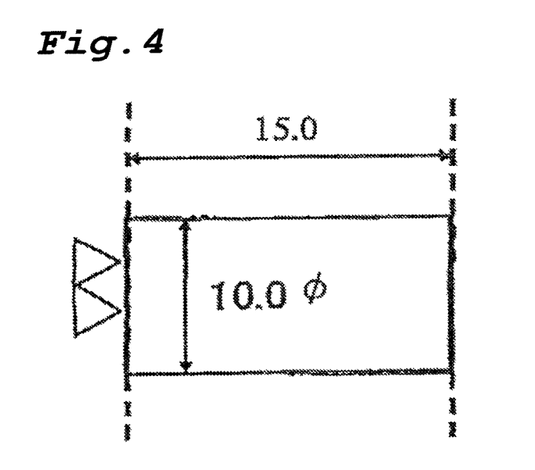
FIG. 4 is a schematic diagram showing the shape of a test specimen for a compression test.

The test steel after the hot rolling was subjected to spheroidizing annealing to make spheroidized material. The spheroidized material was processed into a cylindrical test specimen for a compression test shown in FIG. 4. Then, the obtained test specimen in each sample was subjected to a compression test using a pressing machine. The unit shown in the drawing is mm. The compression rate in the compression test was changed in a range from 70 to 80%, and based on the procedure from step (a) to step (c) to be mentioned below, the critical upsetting rate at which the compression test specimen did not cause cracking was determined and then represented as the crack occurrence critical upsetting rate. In Examples, samples having the critical upsetting rate of 75.0% or more, at which a flange treatment for a bolt can be performed, were rated as having excellent cold forgeability, that is, bolt formability. Note that in the spheroidizing annealing, an $Ac_1$ transformation point of each steel was determined by the formula (3) below, and the steel was kept at the temperature of ($Ac_1$ transformation point+10° C.) for five hours. Then, the steel was cooled to 680° C. at a cooling rate of 10°/Hr.

$$Ac_1 \text{ transformation point} = 723 - 10.7 \times [\text{Mn}] - 16.9 \times [\text{Ni}] + 29.1 \times [\text{Si}] + 16.9 \times [\text{Cr}] \quad (3)$$

where [Mn], [Ni], [Si], and [Cr] indicate contents of Mn, Ni, Si, and Cr, in percentage by mass, respectively.

(Measurement Procedure of Critical Upsetting Rate)

(a) The respective test specimens were subjected to a compression test three times; in the compression test, the compression rate represented by the formula (4) below was set to 50%. If no crack occurs in the test specimen over three times, a specimen of the same kind as this test specimen was used as a new test specimen and subjected to the compression test at the compression rate of 52.5%.

$$\text{Compression Rate} = [(h_0 - h)/h_0] \times 100 (\%) \quad (4)$$

where $h_0$ indicates an initial height of a test specimen, namely, 15 mm; and h indicates the height of the test specimen after the test.

(b) The respective test specimens were subjected to a compression test three times; in the compression test, the compression rate was set to 52.5%. If no crack occurs in the test specimen over three times, a specimen of the same kind as this test specimen was used as a new test specimen and subjected to the compression test at the compression rate of 55.0%.

(c) The maximum compression rate at which no crack occurs in the compression tests performed three times n=3 was defined as the "critical upsetting rate".

These results are shown in Table 3 below.

Thus, even when the heat treatment was performed under a predetermined heating condition, this sample did not cause martensitic transformation during the quenching, thus failing to ensure the desired strength of the steel.

The sample No. 16 is an example of using the steel type B1 in which the C content was large as shown in Table 1.

TABLE 3

| Sample No. | Steel type | Grain size number | Tensile strength (MPa) | Reduction in area (%) | Reduction in mass due to corrosion (%) | Delayed fracture strength ratio | Critical Upsetting rate (%) |
|---|---|---|---|---|---|---|---|
| 1 | A | 11.0 | 1,334 | 68.8 | 0.010 | 0.89 | 80.0 |
| 2 | A | 11.0 | 1,355 | 65.2 | 0.011 | 0.88 | 80.0 |
| 3 | A | 11.5 | 1,302 | 66.2 | 0.009 | 0.83 | 80.0 |
| 4 | B | 11.5 | 1,238 | 69.0 | 0.008 | 0.93 | 80.0 |
| 5 | B | 11.0 | 1,260 | 66.5 | 0.010 | 0.89 | 80.0 |
| 6 | B | 12.0 | 1,210 | 68.1 | 0.007 | 0.87 | 80.0 |
| 7 | C | 11.0 | 1,200 | 69.9 | 0.009 | 0.93 | 80.0 |
| 8 | C | 10.0 | 1,224 | 69.6 | 0.010 | 0.95 | 80.0 |
| 9 | D | 10.5 | 1,110 | 72.6 | 0.006 | 0.95 | 80.0 |
| 10 | D | 10.0 | 1,138 | 72.1 | 0.007 | 0.87 | 80.0 |
| 11 | E | 10.5 | 1,204 | 71.6 | 0.006 | 0.91 | 80.0 |
| 12 | F | 11.0 | 1,127 | 75.4 | 0.009 | 0.93 | 80.0 |
| 13 | A | 11.0 | 1,528 | 64.1 | 0.012 | 0.62 | 80.0 |
| 14 | B | 11.5 | 1,428 | 65.2 | 0.007 | 0.73 | 80.0 |
| 15 | A1 | 11.0 | 979 | 75.0 | — | — | 80.0 |
| 16 | B1 | 11.0 | 1,392 | 66.5 | 0.031 | 0.43 | 80.0 |
| 17 | C1 | 11.0 | 1,382 | 69.5 | 0.002 | 0.83 | 72.5 |
| 18 | D1 | 11.5 | 1,090 | 72.5 | — | — | 80.0 |
| 19 | E1 | 11.0 | 1,187 | 70.4 | 0.019 | 0.45 | 80.0 |
| 20 | F1 | 11.5 | 1,262 | 69.5 | 0.012 | 0.31 | 77.5 |
| 21 | G1 | 11.5 | 1,169 | 71.1 | 0.043 | 0.44 | 80.0 |
| 22 | H1 | 10.5 | 1,097 | 70.2 | — | — | 77.5 |
| 23 | I1 | 11.0 | 1,202 | 67.2 | 0.051 | 0.41 | 80.0 |
| 24 | J1 | 10.5 | 1,311 | 65.5 | 0.009 | 0.82 | 72.5 |
| 25 | K1 | 11.0 | 1,023 | 66.5 | — | — | 80.0 |
| 26 | L1 | 11.0 | 1,198 | 67.2 | 0.010 | 0.81 | 70.0 |
| 27 | M1 | 10.0 | 1,140 | 65.8 | 0.016 | 0.43 | 80.0 |
| 28 | N1 | 10.5 | 1,325 | 65.1 | 0.015 | 0.82 | 70.0 |
| 29 | O1 | 9.0 | 1,120 | 64.5 | 0.018 | 0.47 | 80.0 |
| 30 | P1 | 11.0 | 1,229 | 70.1 | 0.019 | 0.83 | 72.5 |
| 31 | Q1 | 10.5 | 1,024 | 74.2 | — | — | 80.0 |
| 32 | R1 | 10.5 | 1,096 | 68.1 | — | — | 80.0 |
| 33 | S1 | 11.0 | 1,292 | 67.2 | 0.031 | 0.53 | 80.0 |
| 34 | T1 | 8.0 | 1,217 | 61.1 | 0.043 | 0.31 | 80.0 |

Based on these results, the following consideration can be taken. As can be seen from this table, sample Nos. 1 to 12 satisfied the requirements defined by the present invention and had excellent delayed fracture resistance under severe environment, while exhibiting the high strength of 1,100 MPa or more. These samples also had high critical upsetting rate and excellent bolt formability.

On the other hand, sample Nos. 13 to 34 did not satisfy any one of the requirements defined by the present invention, whereby any one of properties was degraded.

The sample Nos. 13 and 14 satisfied the requirements for the chemical composition defined by the present invention. However, both samples had a low tempering temperature and a tensile strength more than 1,400 MPa, and thus reduced the delayed fracture strength ratio. The sample No. 13 had the tempering temperature much lower than that in the sample No. 14, resulting in insufficient precipitation of cementite, lowering the reduction in area, and degrading the ductility of the steel.

The sample No. 15 is an example of using the steel type A1 in which the C content was a little as shown in Table 1.

Thus, in this sample, the amount of hydrogen entry was increased due to degradation in corrosion resistance of the steel, decreasing the delayed fracture strength ratio, thereby degrading the delayed fracture resistance of the steel.

The sample No. 17 is an example of using the steel type C1 in which the Si content was large as shown in Table 1. Thus, in this sample, even though the excellent delayed fracture resistance was exhibited, the critical upsetting rate of the steel type was decreased, making it difficult to execute bolt forming.

The sample No. 18 is an example of using the steel type D1 in which the Mn content was a little as shown in Table 1. Thus, in this sample, the hardenability of the steel type was low, and the quenching became insufficient, so that the steel type could not ensure a predetermined tensile strength.

The sample No. 19 is an example of using the steel type E1 in which the Mn content was excessive as shown in Table 1. Thus, in this sample, the grain boundary strength of the steel was reduced, decreasing the delayed fracture strength ratio, thereby degrading the delayed fracture resistance of the steel.

The sample No. 20 is an example of using the steel type F1 in which both the P and S contents were large as shown in Table 1. Thus, this sample made the grain boundary brittle and degraded the delayed fracture resistance thereof.

The sample No. 21 is an example of using the steel type G1 in which the Ni content was a little as shown in Table 1. Thus, in this sample, the corrosion resistance was degraded, the amount of hydrogen entry was increased to lower the delayed fracture strength ratio, thereby degrading the delayed fracture resistance of the steel.

The sample No. 22 is an example of using the steel type H1 in which the Cr content was a little as shown in Table 1. Thus, in this sample, the hardenability of the steel was low, and the precipitation strengthening during quenching became insufficient, so that the steel could not ensure a predetermined tensile strength.

The sample No. 23 is an example of using the steel type I1 in which the Cr content was also a little as shown in Table 1. Thus, this sample could ensure the tensile strength, but worsened the corrosion resistance thereof. Further, since the amount of hydrogen entry was increased, the delayed fracture strength ratio was lowered, thus degrading the delayed fracture resistance of the steel.

The sample No. 24 is an example of using the steel type J1 in which the Cr content was excessive as shown in Table 1. Thus, in this sample, even though the steel exhibited excellent tensile strength and delayed fracture resistance, the critical upsetting rate of the steel was decreased, making it difficult to execute bolt forming.

The sample No. 25 is an example of using the steel type K1 in which the Mo content was a little and an A value was small as shown in Table 1. Thus, in this sample, the hardenability of the steel was low, and the precipitation strengthening during quenching became insufficient, so that the steel could not ensure a predetermined tensile strength.

The sample No. 26 is an example of using the steel type L1 in which the Mo content was large as shown in Table 1. Thus, in this sample, even though the steel exhibited excellent delayed fracture resistance, the critical upsetting rate of the steel was decreased, making it difficult to execute bolt forming.

The sample No. 27 is an example of using the steel type M1 to which V was not added as shown in Table 1. Even though this sample was tempered at 580° C. as shown in Table 2, it did not generate precipitated carbide crystals and could not exhibit the adequate hydrogen trap effect, resulting in a low delayed fracture strength ratio, degrading the delayed fracture resistance thereof.

The sample No. 28 is an example of using the steel type N1 in which the V content was large as shown in Table 1. Thus, in this sample, coarse carbides were precipitated to decrease the critical upsetting rate, making it difficult to execute bolt forming.

The sample No. 29 is an example of using the steel type O1 to which Ti was not added as shown in Table 1. Thus, in this sample, the prior austenite crystal grain size became coarse, thus degrading the ductility thereof. Further, since the hydrogen trap effect by TiC was not exhibited, the delayed fracture strength ratio was lowered, thus degrading the delayed fracture resistance of the steel.

The sample No. 30 is an example of using the steel type P1 in which the Ti content was large as shown in Table 1. Thus, in this sample, coarse carbides were precipitated to decrease the critical upsetting rate, making it difficult to execute bolt forming.

The sample Nos. 31 and 32 are examples of satisfying the requirements of the present invention regarding individual additive elements and of using the steels Q1 and R1 in which the A value was small as shown in Table 1. Thus, these samples could not ensure the high tensile strength.

The sample No. 33 is an example of using the steel type Si that satisfied the requirements of the present invention regarding individual additive elements and in which a B value was large as shown in Table 1. Thus, in this sample, the amount of solid-soluted C became large, and the ductility of the steel was reduced, decreasing the delayed fracture strength ratio, thereby degrading the delayed fracture resistance of the steel.

The sample No. 34 is an example of using the steel type Ti that imitated SCM435 of a conventional steel as shown in Table 1. In detail, the steel of this sample had C in a large content without containing N, V, and Ti while having a small A value and a large B value. Thus, in this sample, the prior austenite crystal grain size became coarse, thus degrading the ductility thereof. Since Ni was not added, the corrosion resistance of the steel was degraded. Further, since the hydrogen trap effect by TiC was not exhibited, the delayed fracture strength ratio was lowered, thus degrading the delayed fracture resistance of the steel.

The invention claimed is:

1. A steel for high-strength bolts, comprising, in percentage by mass:
   C: 0.10 to 0.30%;
   Ni: 0.4 to 0.7%;
   Si: 0% or more and 0.2% or less;
   Mn: 0.3 to 0.8%;
   P: more than 0% and 0.03% or less;
   S: more than 0% and 0.03% or less;
   Cr: 0.8 to 1.2%;
   Mo: 0.8 to 1.5%;
   V: 0.05 to 0.13%;
   Ti: 0.02 to 0.08%;
   Al: 0.01 to 0.1%;
   N: 0.001 to 0.01%; and
   iron,
   wherein:
   the steel satisfies formulas (1) and (2):

$$0.85 \leq [C]+[Si]/7+[Mn]/5+[Ni]/20+[Cr]/9+[Mo]/2 \leq 1.3 \quad (1)$$

$$[C]-(0.07\times[Mo]+0.20\times[V]) \leq 0.20 \quad (2)$$

where [C], [Si] [Mn] [Ni], [Cr], [Mo], and [V] indicate contents of C, Si, Mn, Ni, Cr, Mo, and V in percentage by mass, respectively.

2. The steel according to claim 1, further comprising:
   Cu: more than 0% and 0.70% or less.

3. A high-strength bolt with delayed fracture resistance, wherein the high-strength bolt is obtained from the steel according to claim 1, and a grain size number of a prior austenite crystal grain size of the steel is 10.0 or more.

4. A high-strength bolt with delayed fracture resistance and a tensile strength of 1,100 to 1,400 MPa, obtained from a process comprising quenching the steel according to claim 1 from 880 to 960° C. and then tempering the steel at 550 to 650° C.

5. The steel according to claim 1, wherein the content of C is 0.10% or more and less than 0.25%.

6. The steel according to claim 1, wherein the content of C ranges from 0.10% to 0.18%.

\* \* \* \* \*